Oct. 6, 1970  C. MICHELSON  3,532,420
OPTICAL SYSTEM FOR CINEMATOGRAPHIC PROJECTION OF VESICULAR FILMS
Filed Feb. 13, 1967
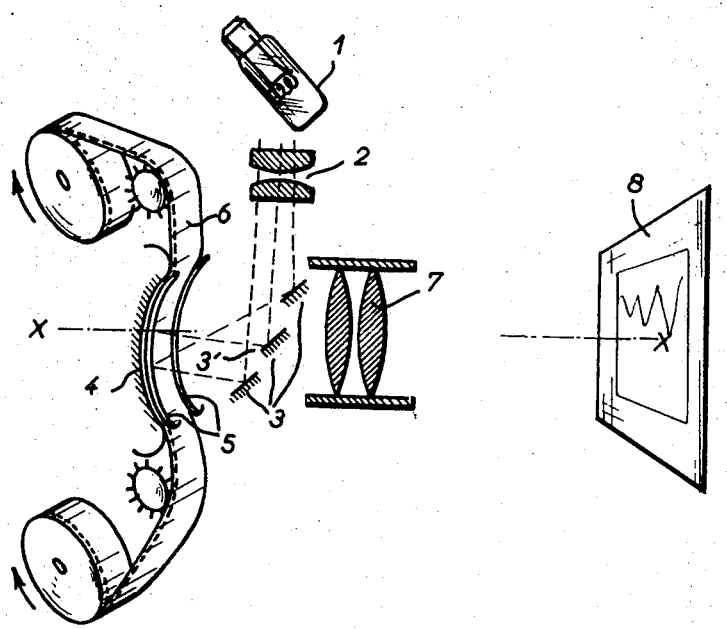
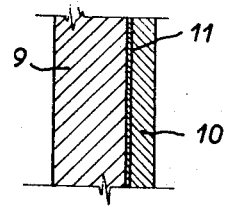
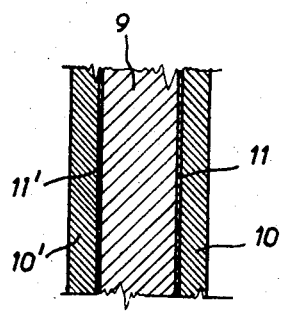

United States Patent Office 3,532,420
Patented Oct. 6, 1970

3,532,420
OPTICAL SYSTEM FOR CINEMATOGRAPHIC PROJECTION OF VESICULAR FILMS
Charles Michelson, Paris, France, assignor to Teverama S.A., Lausanne, Vaud, Switzerland, a company of Switzerland
Filed Feb. 13, 1967, Ser. No. 615,703
Claims priority, application France, Mar. 1, 1966, 51,551
Int. Cl. G03b 21/28
U.S. Cl. 353—99    3 Claims

ABSTRACT OF THE DISCLOSURE

A system for projecting vesicular image bearing films comprising a concave mirror having rectilinear generatrices perpendicular to the direction of progression of the film which is guided so as to follow the surface of said mirror, the latter being associated with a grating of mutually spaced reflecting elements arranged in such a manner that they reflect light rays originating from a laterally offset source towards said mirror and (i) they reflect off sideways light rays sent back by reflection on said mirror so as to prevent them from crossing said grating toward the projection objective, and (ii) they allow diffrated rays to pass through said grating and reach said objective.

BACKGROUND OF THE INVENTION

The present invention relates to an optical projection system for cinematographic films having vesicular images, such as those of the type known as "Kalvar" of which a description is given, for example, in the Journal of the SMPTE of March 1964, volume 73, No. 3, pages 213 et seq., and of September 1965, volume 74, No. 9, pages 786 et seq. Such films, viewed by transmitted light, are for example negative, whereas they will become positive when viewed by reflected light, and vice versa.

However if such vesicular films are to be used with diffracted light, negative copies are employed.

One of the objects of the present invention is to permit an easy projection of said films, while obtaining a good contrast, which is even superior to that of conventional emulsions having silver grains.

SUMMARY OF THE INVENTION

According to the invention, this operation is effected by means of an optical system comprising essentially a concave mirror with rectilinear generatrices (cylindrical or parabolic mirror) perpendicular to the direction of winding of the film, which is guided during its travel so as to follow the surface of the mirror, the latter being associated with a grating of reflecting elements which are spaced from one another and arranged in such a way that firstly they reflect the light rays originating from a laterally offset source toward the said mirror, and secondly they reflect laterally the light rays reflected by the mirror, so that these reflected rays are unable to pass through the said grating in the direction of a projection objective, while on the contrary any diffracted rays will themselves be able to pass through this grating in order to reach the projection objective.

The present invention also concerns the vesicular films comprising one or two reflecting surfaces incorporated into the mass of the film, and being adapted to be projected in the manner described, the incorporated reflecting surface acting as the aforementioned concave mirror having rectilinear generatrices.

BRIEF DESCRIPTION OF THE DRAWING

FIG. 1 is a diagramatic perspective view of a projection system according to the present invention.

FIG. 2 is a part longitudinal section of an improved film;

FIG. 3 is a similar view of one preferred form of film.

DESCRIPTION OF THE PREFERRED EMBODIMENTS

The optical system shown in FIG. 1 is similar in its general principle to that which is used in television for carrying into effect the process known as the "Eidophore" process, of which a description is given in the Cours de Télévision by Y. Delbord, société Francaise des Electriciens, Ecole Supérieure d'Electricité Division Radio-électricité et Electronique, part II, 1962, pages 44 et seq.

This system comprises a light source 1 which is offset laterally relatively to the optical axis X—X of the system and of which the light rays, after having passed through a condenser 2, are adapted to strike a grating of reflecting elements 3, which can be spaced bars leaving an interval between them and which have been shown diagramatically in the form of three small planar mirrors (the number of such mirrors will in practice be greater than three). The light rays are reflected by these elementary mirrors 3 onto a concave mirror 4 which is of cylindrical or parabolic form, provided at its edges with channels or slots 5 of the same shape for guiding a film 6 the "Kalvar" type. It will be noted that the mirror 4 has its generatrices perpendicular to the direction of winding of film 6 and forms the bottom of a guide channel bordered by the grooves 5.

The distance which separates the central element 3' belonging to the reflecting grating 3 of the concave mirror 4 is equal to the radius of curvature of this latter. Generally speaking, the grating 3 is so arranged relatively to the mirror 4 and the light source 1 that firstly, as already stated above, the light rays originating from the said source are reflected onto the mirror 4 and that secondly, in the absence of any diffusing surface in front of the mirror, the rays which it reflects are reflected laterally towards the source 1 and cannot traverse the grating 3 through its intervals or gaps.

However, if the light rays, instead of being purely reflected by the mirror 4, are diffracted by any diffusing element situated in front of it, these diffracted rays will pass through the grating 3 in order to reach the projection objective 7 and the screen 8. This will obviously be the case when the vesicular film 6 is in position on the surface of the mirror 4 and there will then be obtained, on the screen 8, the strongly contrasted reproduction of the vesicular image which is at the instant in question in position on the mirror 4.

Obviously, if the mirror 4 is cylindrical, it will be expedient to provide a usual correction lense between the grating 3 and the objective 7.

It is not essential to have to use a concave mirror such as 4, integrated into the projection system and it would be possible, according to one feature of the present invention, to use vesicular films having their own incorporated reflector.

Such a film is shown in FIG. 2, in which will be seen firstly the plastic support 9 and secondly the vesicular emulsion layer 10. According to the invention, the surface of the support 9 which is to be coated with the emulsion layer 10 is previously given an opaque metallisation 11 which forms a true incorporated flexible mirror. For the projection of such a film, the latter will only require guide grooves 5 shaped in adequate manner and the concave mirror 4 will be dispensed with.

In addition, on account of the opaque character of the metallisation 11, it will be possible with advantage to provide a second vesicular emulsion layer 10' (see FIG. 3) on the opposite face of the plastic support 9, preferably with interposition of a second silvering 11' for reasons of symmetry. This symmetry can moreover be also obtained with a single metallisation, by using a support 9 in two separate identical parts which are coated beforehand or subsequently with a vesicular emulsion layer, the metallisation being carried out before these two parts are united back to back, so that this metallisation is then axially of the film as thus formed. There is then available a double film carrying front and back images, whereby twice the projection period is obtained for the same length of film.

Obviously in the case of sound films, the sound will be recorded on optical tracks which are vesicular, like the image, and reproduced in similar manner.

1. An optical projector system of the kind comprising an objective (7) defining an optical axis of projection (X—X), a film channel device on said axis, means for driving a film through said channel device in a direction of progression generally perpendicular to said axis, a light source (1-2) laterally offset with respect to said axis and adapted to project a beam of light intersecting said axis intermediate said objective and said channel device, and a grating of reflecting elements (3) at said intersection, arranged to reflect said beam of light toward said channel device, wherein the improvement comprises, in said channel drive:

a concave mirror (4-11) substantially centered on said axis and having rectilinear generatrices perpendicular to said direction of progression, and means (5) for guiding aid film to make it follow the surface of said mirror, aid grating of reflecting element being arranged to reflect off sideways light rays sent back by reflection on said mirror whereas diffracted rays are allowed to pass through said grating toward said objective.

2. Projector system as claimed in claim 1, having a fixed structure, wherein said mirror (4) is rigid and integrated into said structure.

3. Projector system as claimed in claim 1, wherein said mirror (11) is flexible and integrated into said film.

References Cited
UNITED STATES PATENTS 3,016,417  1/1962  Mast et al.

FOREIGN PATENTS 657,324  1/1929  France.

SAMUEL S. MATTHEWS, Primary Examiner

U.S. Cl. X.R.

352—228